(12) United States Patent
Fang

(10) Patent No.: US 12,141,405 B2
(45) Date of Patent: Nov. 12, 2024

(54) TOUCH PANEL AND MOBILE TERMINAL

(71) Applicant: WUHAN CHINA STAR OPTOELECTRONICS SEMICONDUCTOR DISPLAY TECHNOLOGY CO., LTD., Hubei (CN)

(72) Inventor: Liang Fang, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/597,156

(22) PCT Filed: Dec. 21, 2021

(86) PCT No.: PCT/CN2021/139867
§ 371 (c)(1),
(2) Date: Dec. 28, 2021

(87) PCT Pub. No.: WO2023/103077
PCT Pub. Date: Jun. 15, 2023

(65) Prior Publication Data
US 2024/0028171 A1   Jan. 25, 2024

(30) Foreign Application Priority Data
Dec. 10, 2021   (CN) .......................... 202111506442.X

(51) Int. Cl.
*G06F 3/044* (2006.01)
*G06F 3/041* (2006.01)
*H04M 1/02* (2006.01)

(52) U.S. Cl.
CPC ........ *G06F 3/0446* (2019.05); *G06F 3/04164* (2019.05); *H04M 1/0266* (2013.01); *H04M 2250/22* (2013.01)

(58) Field of Classification Search
CPC ................... G06F 3/041–0488; G06F 3/04164
See application file for complete search history.

(56) References Cited

U.S. PATENT DOCUMENTS

| | | | | |
|---|---|---|---|---|
| 9,898,134 | B2* | 2/2018 | Wang | ................... G06F 3/04164 |
| 2016/0026291 | A1* | 1/2016 | Zhao | ..................... G06F 3/0412 345/174 |

(Continued)

FOREIGN PATENT DOCUMENTS

| | | |
|---|---|---|
| CN | 104076997 A | 10/2014 |
| CN | 104298404 A | 1/2015 |

(Continued)

OTHER PUBLICATIONS

Chinese Office Action issued in corresponding Chinese Patent Application No. 202111506442.X dated May 20, 2023, pp. 1-9.

(Continued)

*Primary Examiner* — Amy Onyekaba

(57) ABSTRACT

A touch panel and a mobile terminal are disclosed in the embodiment of the present disclosure. The touch panel includes a touch layer, a signal line layer, and a plurality of redundant touch lines extending in a first direction. The touch layer includes a plurality of touch blocks, and one of the touch blocks includes a plurality of touch units. The signal line layer includes a plurality of signal units, and one of the signal units is electrically connected to one of the touch blocks. The redundant touch lines are insulated from the touch units, and one of the redundant touch lines or one of the signal units is disposed between two adjacent ones of the touch units.

19 Claims, 12 Drawing Sheets

(56) References Cited

U.S. PATENT DOCUMENTS

| | | | | |
|---|---|---|---|---|
| 2016/0170544 A1* | 6/2016 | Wang | ............... | G06F 3/04164 345/173 |
| 2016/0170560 A1* | 6/2016 | Zhan | ............... | G06F 3/04164 345/174 |
| 2016/0306454 A1* | 10/2016 | Wang | ............... | G06F 3/0412 |
| 2016/0378254 A1* | 12/2016 | Wang | ............... | G06F 3/0443 345/174 |
| 2017/0185223 A1* | 6/2017 | Lu | ............... | G06F 3/0412 |
| 2018/0032191 A1* | 2/2018 | Xiao | ............... | G06F 3/0412 |
| 2018/0366495 A1* | 12/2018 | Xu | ............... | H01L 27/124 |
| 2020/0310574 A1* | 10/2020 | Pan | ............... | G06F 3/04164 |
| 2021/0055816 A1* | 2/2021 | An | ............... | H10K 50/844 |
| 2021/0165516 A1* | 6/2021 | Deng | ............... | G06F 3/04164 |
| 2023/0376159 A1* | 11/2023 | Zhang | ............... | G06F 3/0443 |
| 2023/0409141 A1* | 12/2023 | Lin | ............... | G06F 3/0412 |

FOREIGN PATENT DOCUMENTS

| | | |
|---|---|---|
| CN | 104536637 A | 4/2015 |
| CN | 105808014 A | 7/2016 |
| CN | 105974639 A | 9/2016 |
| CN | 108646451 A | 10/2018 |
| CN | 108776551 A | 11/2018 |
| CN | 109725770 A | 5/2019 |
| CN | 111258459 A | 6/2020 |
| CN | 111665999 A | 9/2020 |
| CN | 112198990 A | 1/2021 |
| CN | 112363636 A | 2/2021 |
| CN | 112882598 A | 6/2021 |
| CN | 113238402 A | 8/2021 |
| CN | 113296640 A | 8/2021 |
| CN | 113467639 A | 10/2021 |
| WO | 2021114282 A1 | 6/2021 |

OTHER PUBLICATIONS

International Search Report in International application No. PCT/CN2021/139867, mailed on Sep. 7, 2022.

Written Opinion of the International Search Authority in International application No. PCT/CN2021/139867, mailed on Sep. 7, 2022.

* cited by examiner

TOUCH PANEL AND MOBILE TERMINAL

FIELD OF INVENTION

The present disclosure relates to the field of display technologies, and in particular to a touch panel and a mobile terminal.

BACKGROUND OF INVENTION

In recent years, touch quality is a very important factor in the quality of mobile terminals. An important touch technology of touch panels is self-capacitive, in which touch blocks and touch signal lines are realized by different layers of metal. Moreover, the touch blocks and the touch signal lines adopt a single and double hybrid wiring method, and thus a single touch signal line and double touch signal lines are configured continuously. For fine application scenarios such as stylus, touch effects of single and double wires are different, and the touch is not uniform, resulting in different touch responses or touch accuracy of touch areas corresponding to different line densities, and reducing touch quality.

Therefore, there is an urgent need for a touch panel and a mobile terminal to solve the above technical problems.

SUMMARY OF INVENTION

Technical Problems

The present disclosure provides a touch panel and a mobile terminal, which can alleviate the current technical problems of different touch response or touch accuracy of the touch areas corresponding to different line densities.

Technical Solutions

In order to solve the above problems, the technical solutions provided by the present disclosure are as follows:

An embodiment of the present disclosure provides a touch panel, including:
- a touch layer, including a plurality of touch blocks disposed in an array at intervals, wherein one of the touch blocks includes a plurality of touch units extending along a first direction and electrically connected to each other;
- a signal line layer located on one side of the touch layer, wherein the signal line layer includes a plurality of signal units extending along the first direction, wherein one of the signal units is electrically connected to one of the touch blocks; and
- a plurality of redundant touch lines extending along the first direction, wherein the redundant touch lines are insulated from the touch units;
- wherein one of the redundant touch lines or one of the signal units is disposed between two adjacent ones of the touch units.

Preferably, in a top view direction of the touch panel, the signal units, the redundant touch lines, and the touch units are all disposed non-overlappingly.

Preferably, same number of the signal units are disposed between two adjacent ones of the redundant touch lines.

Preferably, one of the touch units is disposed between two adjacent ones of the redundant touch lines.

Preferably, the redundant touch lines are disposed close to a corresponding center area of the touch blocks, or the redundant touch lines are disposed close to a corresponding periphery of the touch blocks.

Preferably, the signal units, the redundant touch lines, and the touch units are all disposed in a single line.

Preferably, the redundant touch lines are disposed on the same layer as the touch units or/and the signal units.

Preferably, the touch blocks further include at least one connection unit, the connection unit is on the same layer as the touch units and connects two adjacent ones of the touch units, the connection unit extends along a second direction, and the second direction is perpendicular to the first direction; wherein the redundant touch lines and the signal units are disposed on the same layer, the connection unit and the touch units are disposed on the same layer, or the redundant touch lines and the touch units are disposed on the same layer, the redundant touch lines include a first unit disposed on the same layer as the touch units and a first jumper electrically connected to the first unit, the first jumper and the touch units are disposed on different layers, and the first jumper crosses the connection unit.

Preferably, the touch panel further includes a display panel located on one side of the signal line layer away from the touch layer, and the display panel includes a plurality of sub-pixels; wherein in the top view direction of the touch panel, along the first direction, any one of the touch units, the signal units, and the redundant touch lines are disposed between two adjacent rows of the sub-pixels.

Preferably, the touch panel further includes an integrated control unit located on one end of the touch panel, and any one of the signal units is electrically connected to the integrated control unit; wherein at least one of the touch blocks is a first touch block, in the top view direction of the touch panel, in the first touch block, the signal unit is at least a first sub-unit or a second sub-unit, the first sub-unit is electrically connected to the first touch block, and a distance between the electrical connection point of the second sub-unit and the corresponding touch block and the integrated control unit is greater than a distance between the electrical connection point of the first sub-unit and the touch block and the integrated control unit; wherein one of the second sub-units is electrically connected in parallel with at least one of the redundant touch lines of the first touch block.

Preferably, the redundant touch lines and the touch units are disposed on the same layer; the signal line layer includes a first connection line disposed on the same layer as the second sub-unit, and the first connection line is electrically connected to the second sub-unit; and the touch panel further includes a first insulating layer located between the signal line layer and the touch layer, wherein the first insulating layer includes a plurality of second via holes, the first connection line is exposed through the second via hole, and the first connection line is electrically connected to the corresponding redundant touch line through the second via hole.

Preferably, the redundant touch lines are disposed on the same layer as the second sub-unit, the signal line layer further includes a first connection line disposed on the same layer as the second sub-unit, the first connection line is electrically connected to the second sub-unit, and the second sub-unit and the corresponding redundant touch line are electrically connected through the first connection line.

Preferably, at least one of the redundant touch lines electrically connected to the second sub-unit includes a first redundant segment and a second redundant segment, the first redundant segment is disposed on the same layer as the touch units, and the second redundant segment is disposed on the same layer as the second sub-unit; the signal line layer includes a first connection line disposed on the same layer as the second sub-unit, and the first connection line is electrically connected to the second sub-unit; and the touch panel further includes a first insulating layer located between the signal line layer and the touch layer, the first insulating layer includes a plurality of third via holes, the second redundant segment is exposed via the third via hole, the first redundant segment is electrically connected to the second redundant segment through the third via hole, and the second redundant segment is electrically connected to the first connection line.

An embodiment of the present disclosure further provides a mobile terminal, including: a touch panel and a terminal body, the touch panel and the terminal body being combined into one body, the touch panel including:

a touch layer, including a plurality of touch blocks disposed in an array at intervals, wherein one of the touch blocks includes a plurality of touch units extending along a first direction and electrically connected to each other;

a signal line layer located on one side of the touch layer, wherein the signal line layer includes a plurality of signal units extending along the first direction, wherein one of the signal units is electrically connected to one of the touch blocks; and a plurality of redundant touch lines extending along the first direction, wherein the redundant touch lines are insulated from the touch units;

wherein one of the redundant touch lines or one of the signal units is disposed between two adjacent ones of the touch units.

Preferably, in a top view direction of the touch panel, the signal units, the redundant touch lines, and the touch units are all disposed non-overlappingly.

Preferably, same number of the signal units are disposed between two adjacent ones of the redundant touch lines.

Preferably, one of the touch units is disposed between two adjacent ones of the redundant touch lines.

Preferably, the redundant touch lines are disposed close to a corresponding center area of the touch blocks, or the redundant touch lines are disposed close to a corresponding periphery of the touch blocks.

Preferably, the signal units, the redundant touch lines, and the touch units are all disposed in a single line.

Preferably, the redundant touch lines are disposed on the same layer as the touch units or/and the signal units.

Beneficial Effect

In the present disclosure, in the top view direction of the touch panel, the redundant touch lines are insulated from the touch units, and one of the redundant touch lines or one of the signal units is disposed between two adjacent ones of the touch units. By arranging the touch units evenly, a distribution density of the touch units in different areas is uniform, which improves the uniformity of touch response, enhances the uniformity of touch accuracy, and improves touch performance.

DETAILED DESCRIPTION OF PREFERRED EMBODIMENTS

The present disclosure provides a touch panel and a mobile terminal. In order to make the purpose, technical solution, and effect of the present disclosure more definite and clearer, the present disclosure is further described in detail below with reference to the accompanied drawings and embodiments. It should be understood that the specific embodiments described here are only used to explain the present disclosure, and are not used to limit the present disclosure.

The embodiment of the present disclosure provides a touch panel and a mobile terminal. Detailed descriptions are given below. It should be noted that the order of description in the following embodiments is not meant to limit the preferred order of the embodiments.

Please refer to FIG. 1 to FIG. 17. An embodiment of the present disclosure provides a touch panel 100, including:

a touch layer, including a plurality of touch blocks A disposed in an array at intervals, and one of the touch blocks A includes a plurality of touch units 200 extending along a first direction and electrically connected to each other;

a signal line layer located on one side of the touch layer, wherein the signal line layer includes a plurality of signal units 300 extending along the first direction, and one of the signal units 300 is electrically connected to one of the touch blocks A; and a plurality of redundant touch lines 400, wherein the redundant touch lines 400 are insulated from the touch units 200.

One of the redundant touch lines 400 or one of the signal units 300 is disposed between two adjacent ones of the touch units 200.

In the present disclosure, one of the redundant touch lines or one of the signal units is disposed between two adjacent ones of the touch units, so that the touch units are disposed uniformly, and a distribution density of the touch units in different areas is uniform, which improves the uniformity of touch response, enhances the uniformity of touch accuracy, and improves touch performance.

The technical solution of the present disclosure is now described with reference to specific embodiments.

In the present embodiment, the touch panel 100 includes a touch layer and a signal line layer on one side of the touch layer.

In some embodiments, the touch layer includes a plurality of touch blocks A disposed in an array at intervals, and one of the touch blocks A includes a plurality of touch units 200 extending along a first direction and electrically connected to each other. The signal line layer includes a plurality of signal units 300 extending along the first direction, and one of the signal units 300 is electrically connected to one of the touch blocks A. In the figure, the first direction is the Y-axis direction, and the second direction below is the X-axis direction.

In FIGS. 1 to 17, the line type is only to distinguish different types of lines for easy understanding, and does not represent the real shape of the line, which is explained here.

Figure 1:
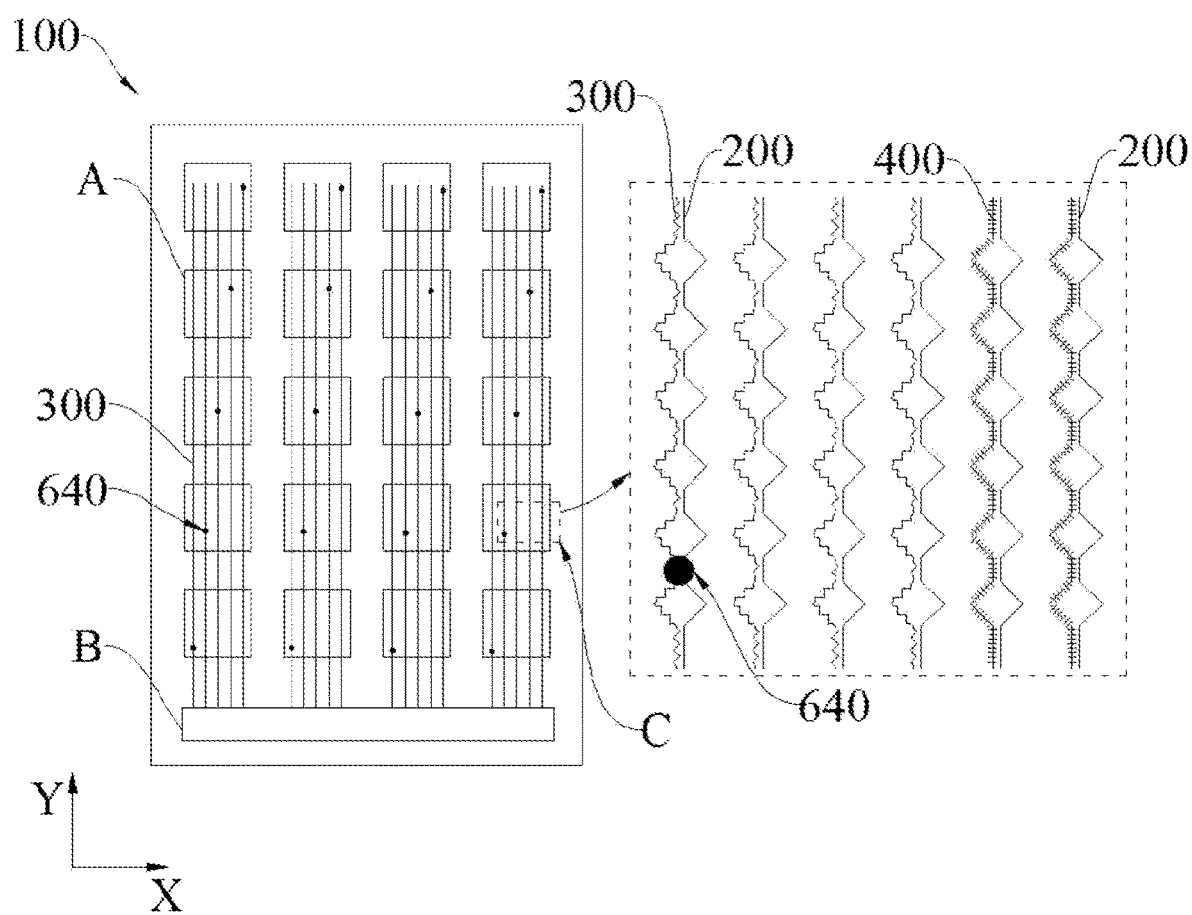
FIG. 1 is a schematic top view of a first structure of a touch panel provided by an embodiment of the present disclosure.

Please refer to FIG. 1, the touch panel 100 further includes a first insulating layer 600 located between the signal line layer and the touch layer, and the first insulating layer 600 includes a plurality of fourth via holes 640. The signal units 300 are electrically connected to the touch units 200 corresponding to the touch blocks A through the fourth via holes 640, wherein the structure diagram is easy to understand, and only a top view is shown.

Please refer to FIG. 1. In some embodiments, the touch panel 100 further includes a plurality of redundant touch lines 400, and the redundant touch lines 400 are insulated from the touch units 200. In the top view direction of the touch panel 100, one of the redundant touch lines 400 or one of the signal units 300 is disposed between two adjacent ones of the touch units 200. The touch units 200 are separated from each other by the redundant touch lines 400 or the signal units 300, so that the touch units 200 are disposed evenly, and the distribution density of the touch units 200 in different areas is uniform, thereby improving the uniformity of touch response, enhancing the uniformity of touch accuracy, and improving touch performance.

Figure 2:
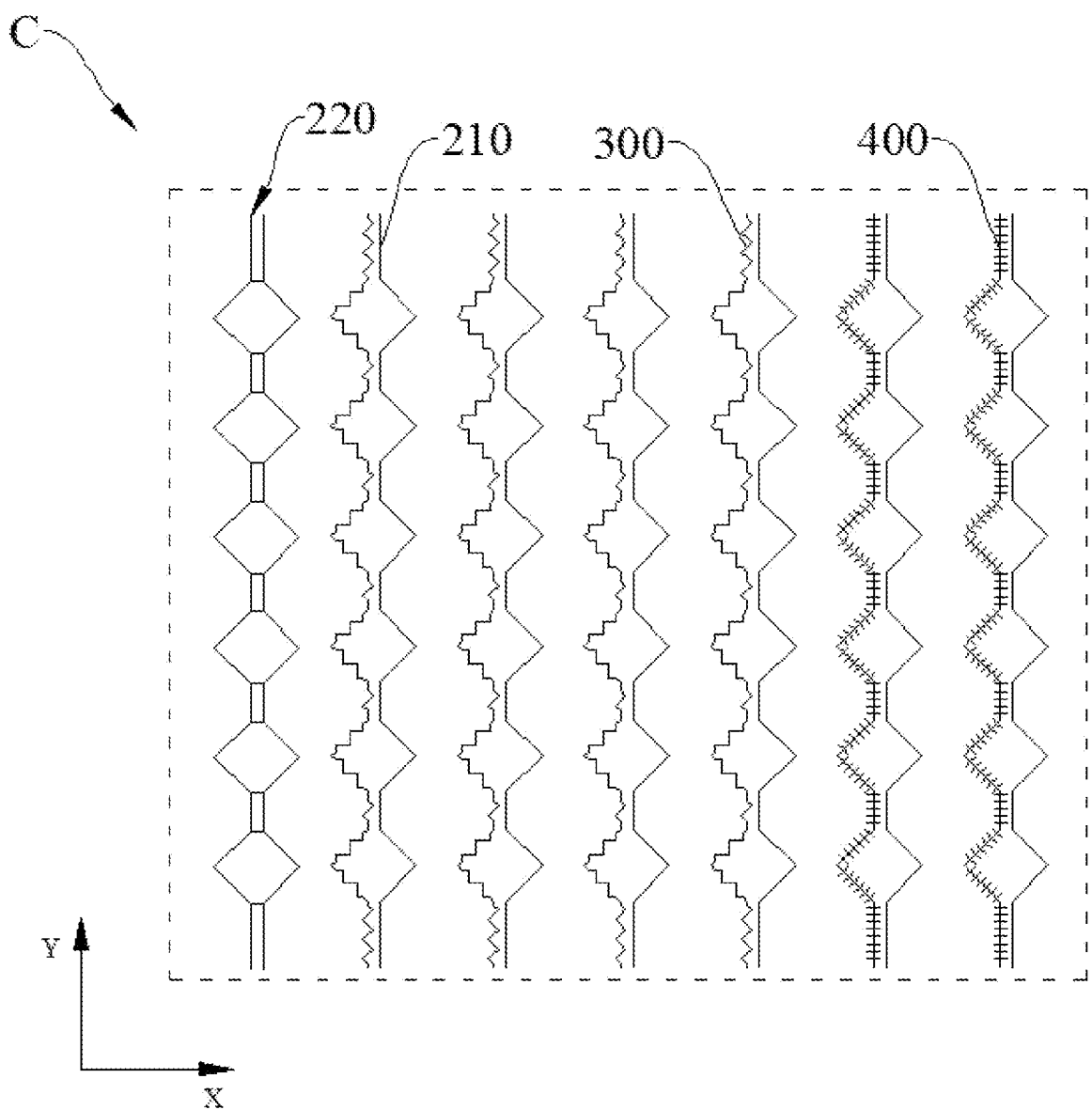
FIG. 2 is a schematic top view of the first structure of an area C in FIG. 1.

Please refer to FIG. 2. In some embodiments, the touch units 200 may be configured as a single line, or may be configured as double lines in parallel. In the figure, the touch units 200 as a single line is represented by a single line 210. The touch units 200 connected in parallel with double lines is represented by double lines 220.

Figure 3:
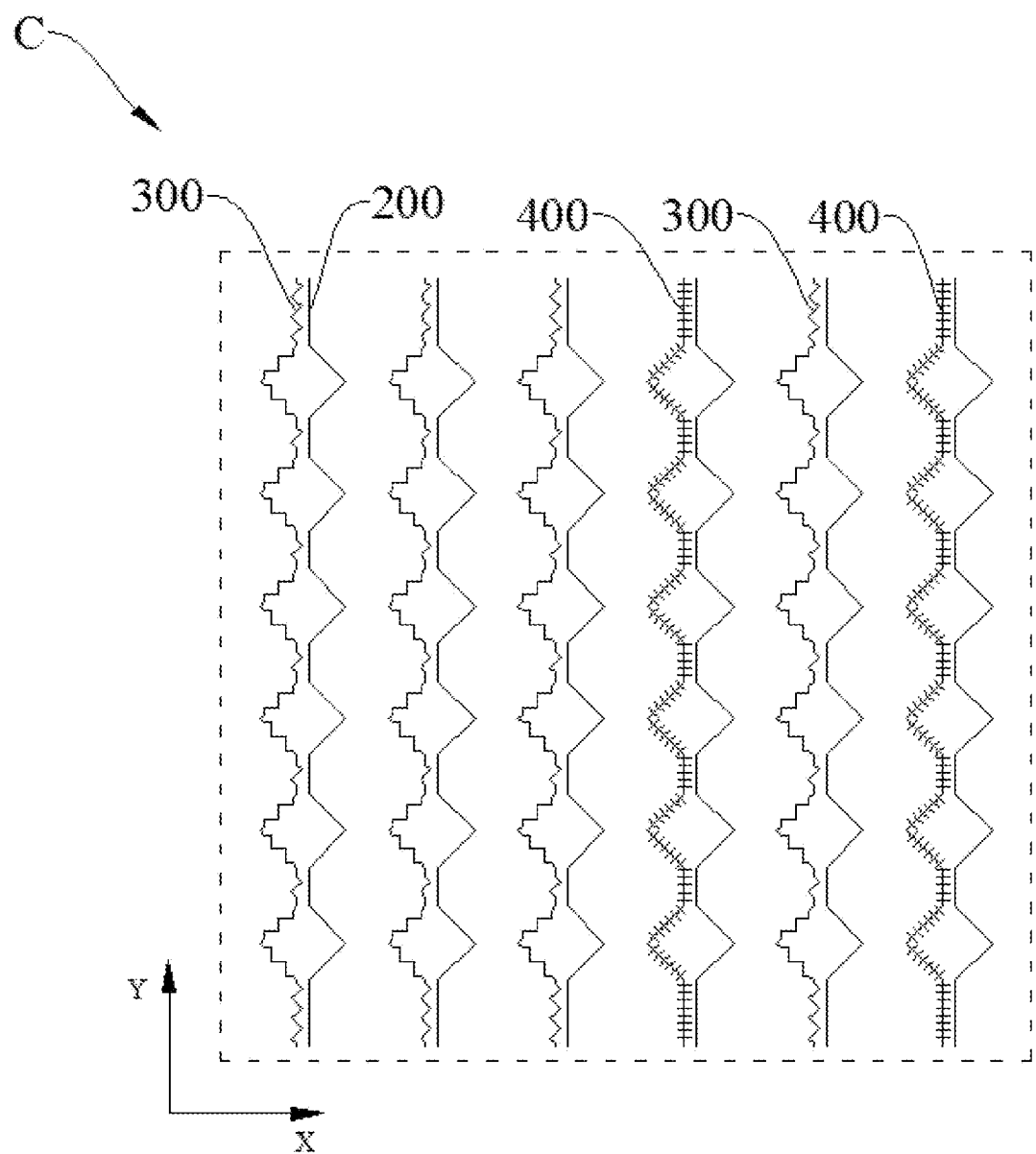
FIG. 3 is a schematic top view of a second structure of the area C in FIG. 1.

Please refer to FIG. 3. In some embodiments, the signal units 300, the redundant touch lines 400, and the touch units 200 are all configured as a single line. There are still subtle differences between the double-line parallel connection and the single-line in the configuration methods in the fine touch. The touch units 200 are configured as a single line, which can further enhance the uniform arrangement of the touch units 200. The distribution density of the touch units in different areas is uniform, thereby improving the uniformity of touch response, enhancing the uniformity of touch accuracy, and improving touch performance.

Please refer to FIGS. 2 and 3. In some embodiments, in the top view direction of the touch panel 100, the signal units 300, the redundant touch lines 400, and the touch units 200 are all disposed non-overlappingly. At least the signal units 300 and the touch units 200 are disposed non-overlappingly, which can reduce the parasitic capacitance between the two, thereby reducing the burden of touch driving, reducing the driving voltage, reducing the driving frequency, and reducing the driving power consumption. The cost is reduced and the reliability of the touch panel 100 is improved.

Please refer to FIG. 3. In some embodiments, in the top view direction of the touch panel 100, a number of the signal units 300 disposed between two adjacent ones of the redundant touch lines 400 is the same. The redundant touch lines 400 are evenly distributed, which can improve the uniformity of wiring and reduce the mutual influence between different types of wires. For example, one of the redundant touch lines 400 is disposed in the middle area, and another one of the redundant touch lines 400 is disposed on an edge, so as to reduce the optical or capacitive difference caused by the redundant touch lines 400 and the non-overlapping design, thereby improving the uniformity of touch response, enhancing the uniformity of touch accuracy, and improving touch performance.

Figure 4:
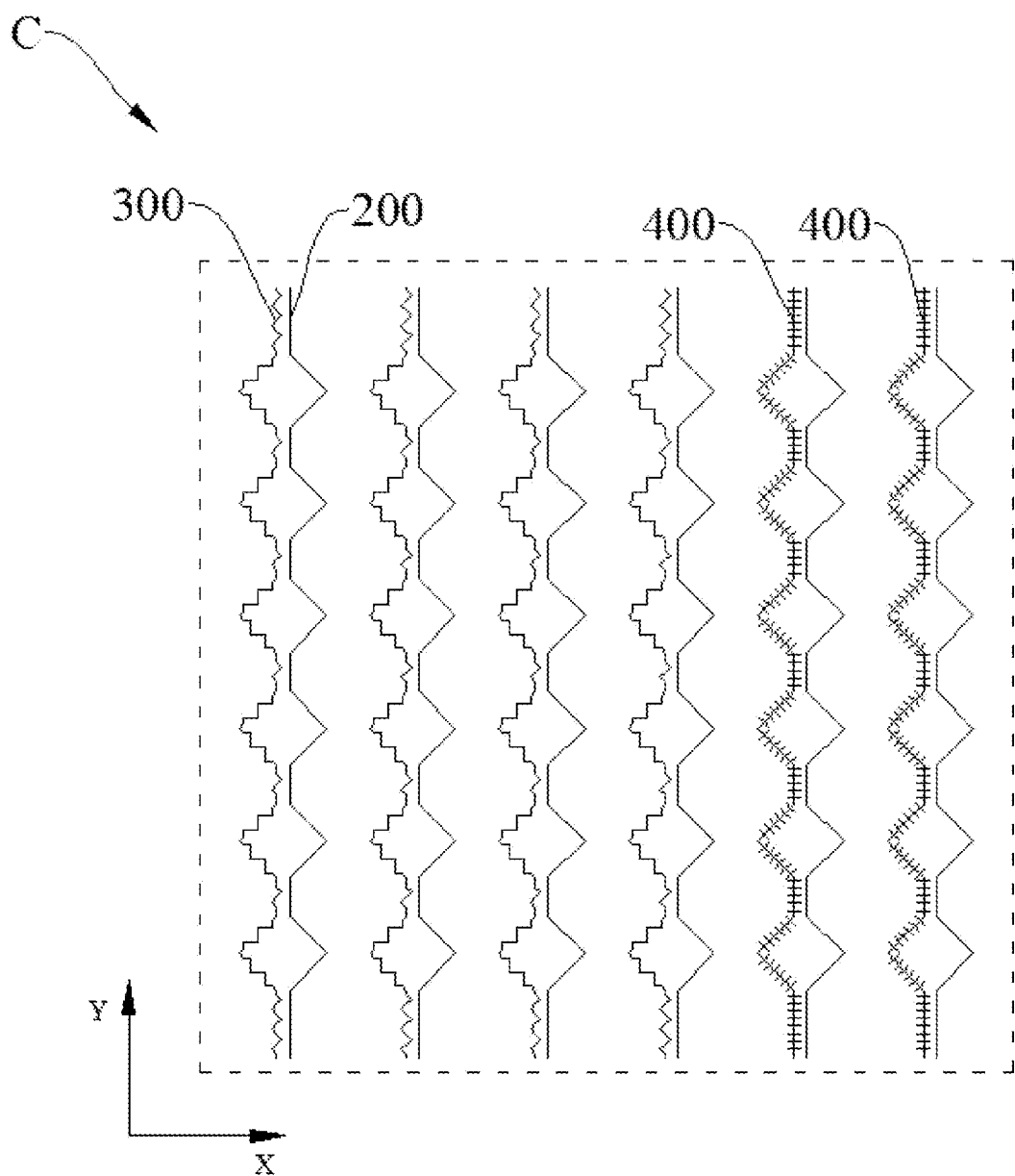
FIG. 4 is a schematic top view of a third structure of the area C in FIG. 1.

Please refer to FIG. 4. In some embodiments, in the top view direction of the touch panel 100, one of the touch units 200 is disposed between two adjacent ones of the redundant touch lines 400. Only one of the touch units 200 is disposed between two adjacent ones of the redundant touch lines 400. The redundant touch lines 400 are disposed collectively, and signal lines of the same type are grouped together, so as to facilitate the wire management.

Figure 5:
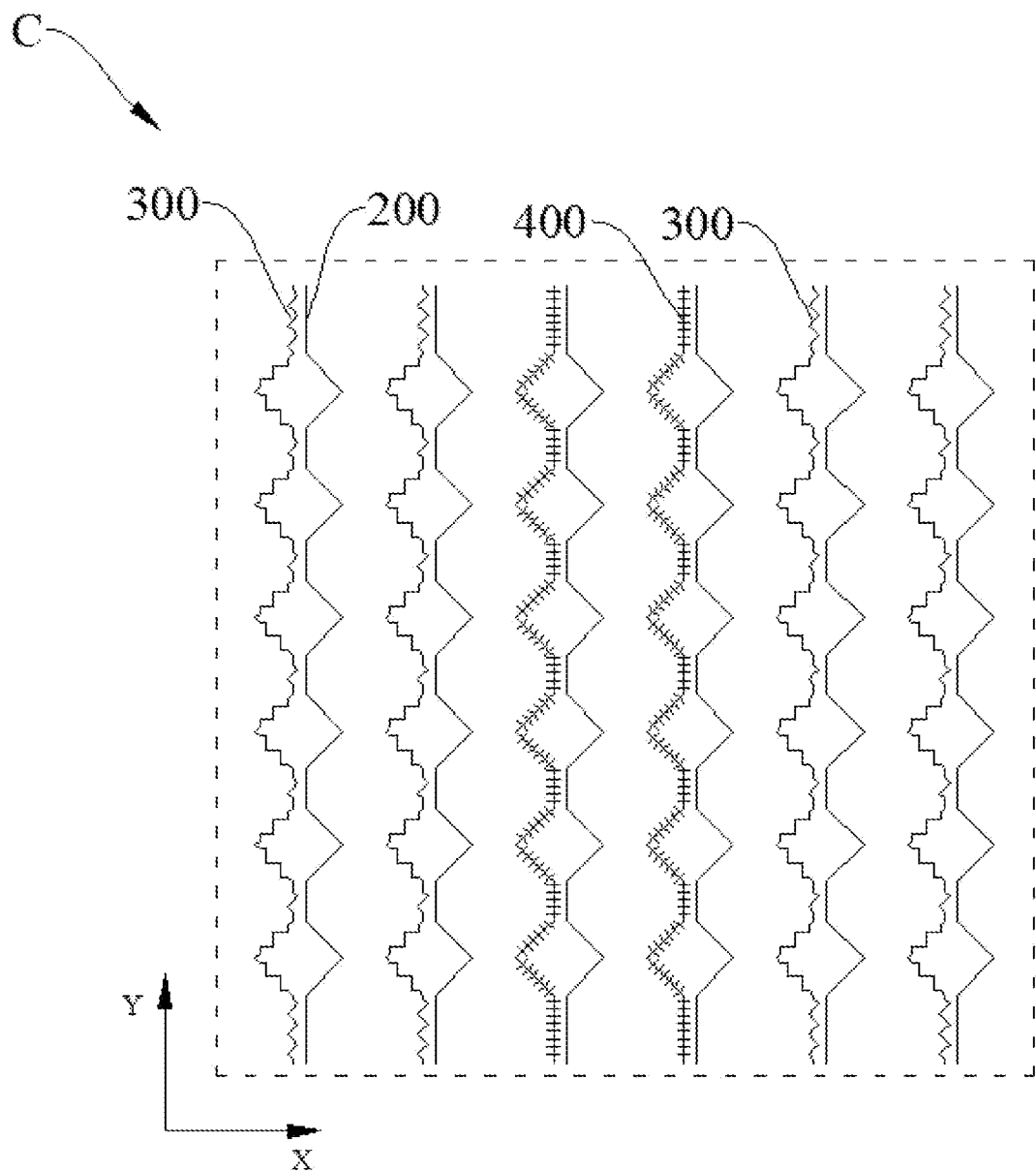
FIG. 5 is a schematic top view of a fourth structure of the area C in FIG. 1.

Please refer to FIG. 5. In some embodiments, the redundant touch lines 400 are disposed close to a corresponding central area of the touch blocks A, or the redundant touch lines 400 are disposed close to a corresponding periphery of the touch blocks A (see FIG. 4). By centralizing the redundant touch lines 400 in the central area of the touch blocks A or close to the corresponding periphery of the touch blocks A, the uniformity of the wiring in the periphery or the central area can be improved.

Figure 7:
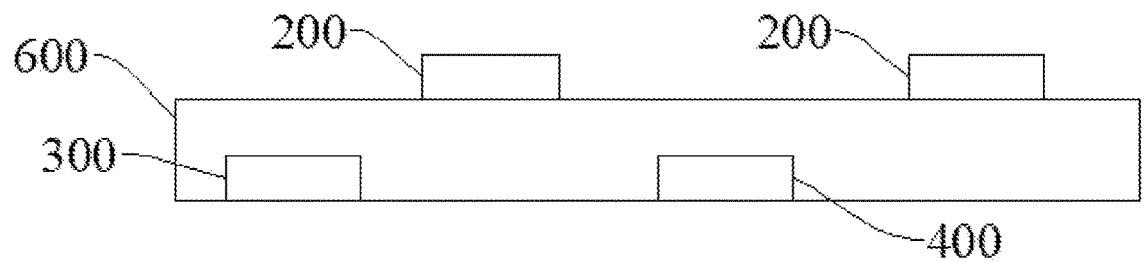
FIG. 7 is a schematic diagram of the first structure along a D1D2 section of FIG. 6.
Figure 8:
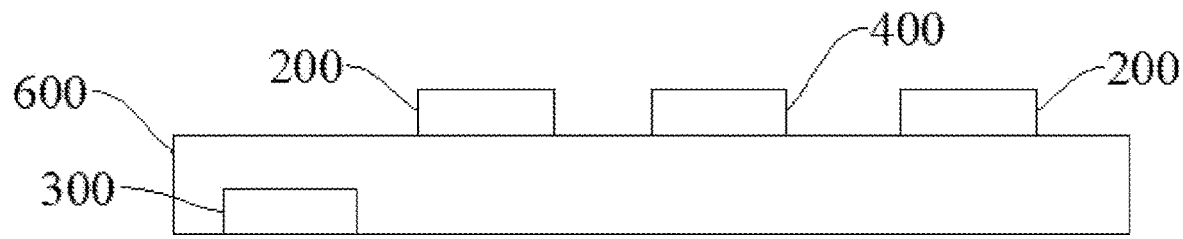
FIG. 8 is a schematic diagram of the second structure along the D1D2 section of FIG. 6.

Please refer to FIGS. 7 and 8. In some embodiments, the redundant touch lines 400 are disposed on the same layer as the touch units 200 or/and the signal units 300.

The redundant touch lines 400 may be disposed on the same layer as the touch units 200, on the same layer as the signal units 300, or on both layers, depending on actual processes and wiring conditions. The wiring is flexible.

Figure 6:
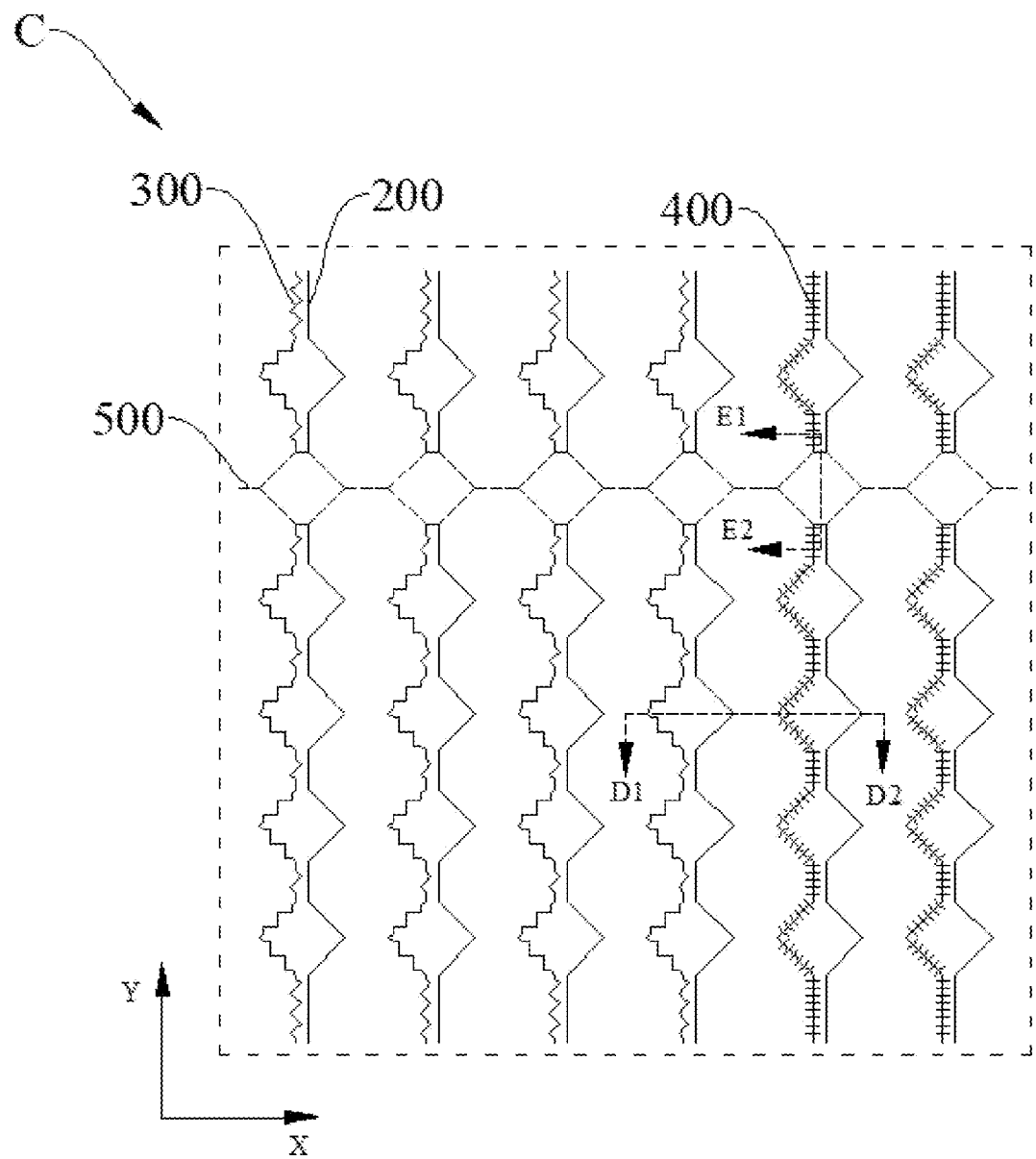
FIG. 6 is a schematic top view of a fifth structure in the area C in FIG. 1.
Figure 9:
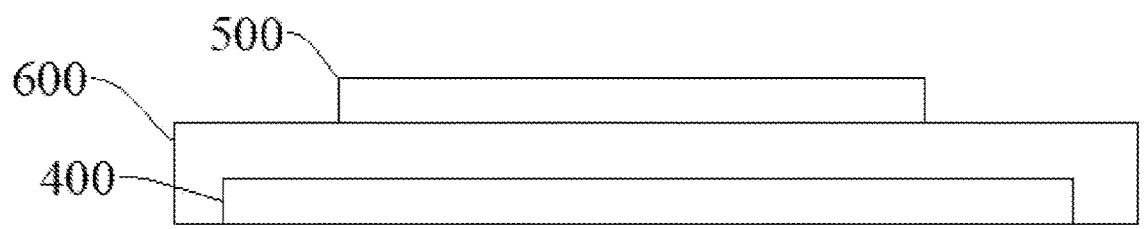
FIG. 9 is a schematic diagram of the first structure along an E1E2 section of FIG. 6.
Figure 10:
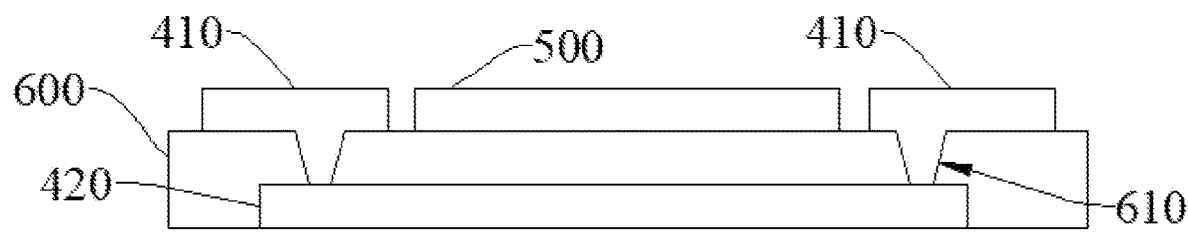
FIG. 10 is a schematic diagram of the second structure along the E1E2 section of FIG. 6.

Please refer to FIGS. 6, 9 and 10. In some embodiments, the touch blocks A further include at least one connection unit 500, which is on the same layer as the touch units 200 and connects two adjacent ones of the touch units 200. The connection unit 500 extends along a second direction which is perpendicular to the first direction. The redundant touch lines 400 are on the same layer as the signal units 300. The connection unit 500 is disposed on the same layer as the touch units 200, or the redundant touch lines 400 are disposed on the same layer as the touch units 200. The connection unit 500 includes a first unit 410 on the same layer as the touch units 200 and a first jumper 420. The first jumper 420 and the touch units 200 are disposed on different layers. The first jumper 420 is electrically connected to the first unit 410 through first via holes 610, and the first jumper 420 crosses the connection unit 500.

The connection unit 500 connects the touch units 200 in one of the touch blocks A, so as to realize independent touch recognition of the touch block A, and to realize the multipoint recognition touch control of the touch panel 100. The redundant touch lines 400 and the signal units 300 are disposed on the same layer, the connection unit 500 and the touch units 200 are disposed on the same layer, and the redundant touch lines 400 may not interfere with the wiring of the connection unit 500. The connection unit 500 can directly connect the adjacent ones of the touch units 200. The redundant touch lines 400 are disposed on the same layer as the touch units 200, and the redundant touch lines 400 includes a first unit 410 disposed on the same layer as the touch units 200 and a first jumper 420 electrically connected to the first unit 410. The first jumper 420 and the touch units 200 are disposed on different layers.

Please refer to FIG. 10. The touch panel 100 further includes a first insulating layer 600 located between the signal line layer and the touch layer, and the first insulating layer 600 includes a plurality of first via holes 610. The first jumper 420 is electrically connected to the first unit 410 through the first via holes 610, and a jumper of the first jumper 420 from the touch layer to the signal line layer may be conducted. Jumper for the redundant touch line 400 avoids short circuit between the redundant touch line 400 and the connection unit 500.

In some embodiments, the first insulating layer 600 may be organic insulating material or inorganic insulating material. The organic insulating material may include flexible material such as polyimide, and the inorganic insulating material may be silicon oxide or/and nitrogen-silicon compounds. Moreover, ultra-thin or transparent configurations may be made according to actual needs. This is only an example, and is not limited herein.

In some embodiments, as an area of the touch panel 100 increases, a length of the signal unit 300 increases, and resistance of the signal units 300 increases, so that voltage drop of the signal units 300 increases. The voltage drops of the signal units 300 of different lengths are different, resulting in different working quality of the different signal units 300, and resulting in different touch quality in different areas, thereby affecting touch experience.

Figure 11:
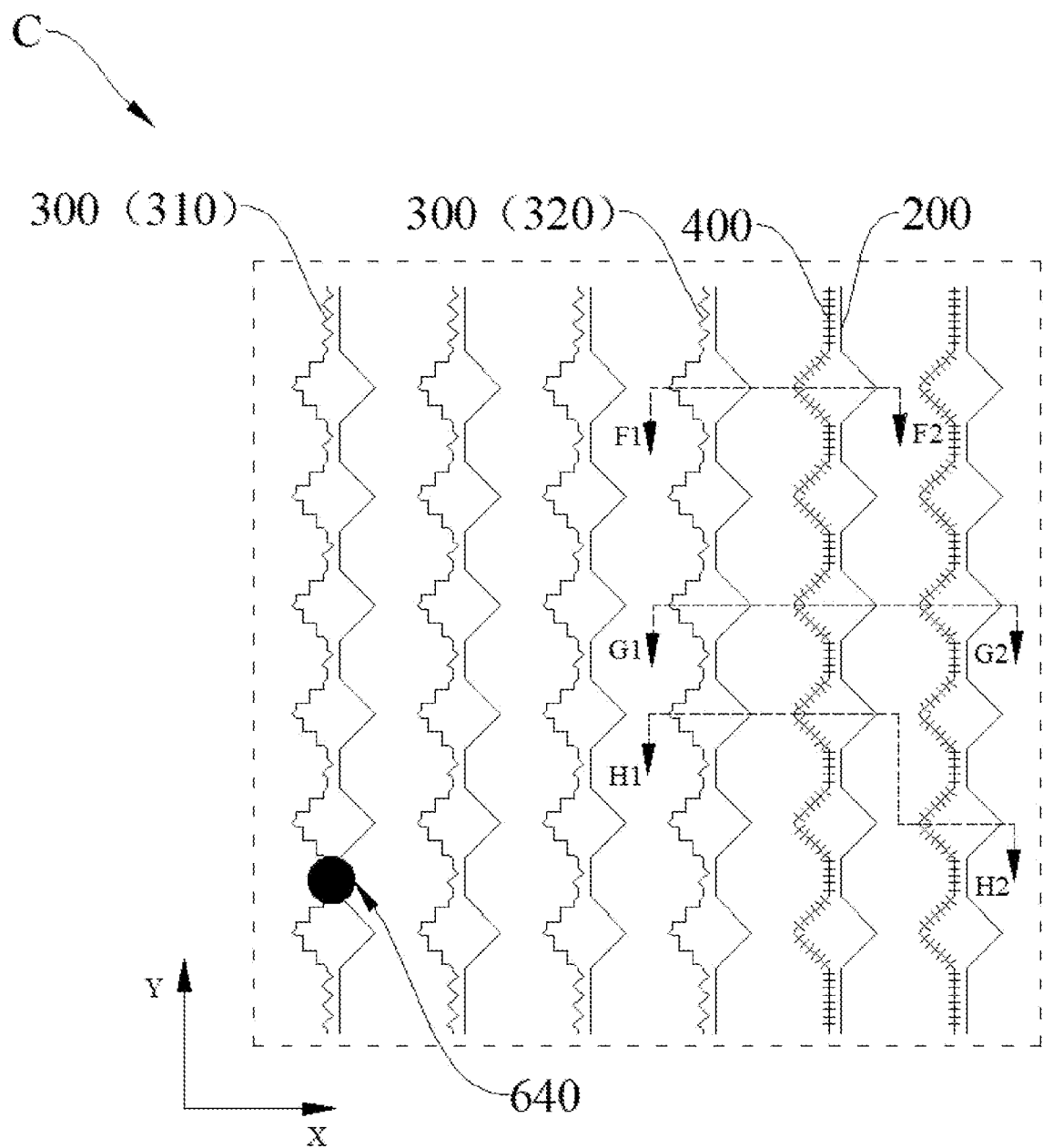
FIG. 11 is a schematic top view of a sixth structure of the area C in FIG. 1.

Please refer to FIGS. 1 and 11. The touch panel 100 further includes an integrated control unit B located on one end of the touch panel 100. Any one of the signal units 300 is electrically connected to the integrated control unit B. At least one of the touch blocks A is the first touch block A. In the top view direction of the touch panel 100, in the first touch block A, the signal unit 300 is at least a first sub-unit 310 or a second sub-unit 310. The first sub-unit 310 is electrically connected to the first touch block A, and a distance between the electrical connection point of the second sub-unit 320 and the corresponding touch block A and the integrated control unit B is greater than a distance between the electrical connection point of the first sub-unit 310 and the touch block A and the integrated control unit B. One of the second sub-units 320 is electrically connected in parallel with at least one of the redundant touch lines 400 of the first touch block A.

The signal unit 300 which is far away the integrated control unit B is the second sub-unit 320. Connecting the second sub-unit 320 to the redundant touch lines 400 in parallel can reduce resistance of the signal unit 300 far away the integrated control unit B, the voltage drop of the signal unit 300 of different lengths, and difference in touch quality in different areas, and improve touch experience.

In some embodiments, in one of the touch blocks A, a number of the second sub-unit 320 is at least one.

Figure 12:
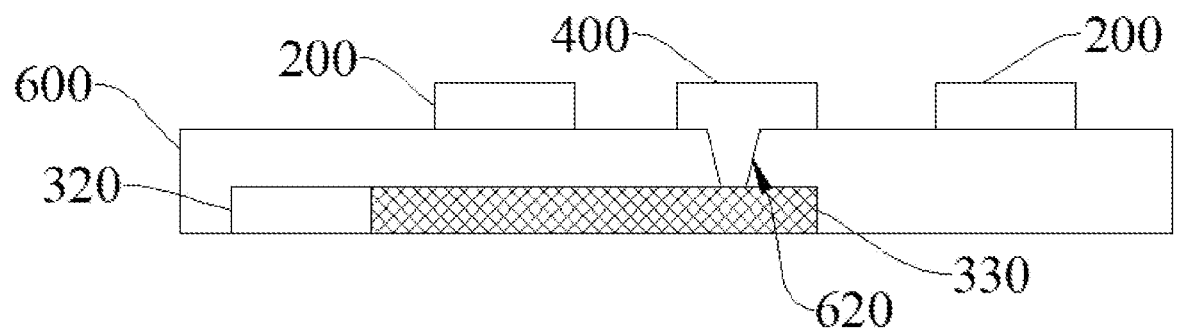
FIG. 12 is a schematic diagram of the first structure along a F1F2 section of FIG. 11.

Please refer to FIG. 12. In some embodiments, the redundant touch lines 400 are disposed on the same layer as the touch units 200. The signal line layer includes a first connection line 330 disposed on the same layer as the second sub-unit 320, and the first connection line 330 is electrically connected to the second sub-unit 320. The touch panel 100 further includes a first insulating layer 600 located between the signal line layer and the touch layer, and the first insulating layer 600 includes a plurality of second via holes 620, the first connection line 330 is exposed through the second via hole 620, and the first connection line 330 is electrically connected to the corresponding redundant touch line 400 through the second via hole 620.

The redundant touch lines 400 and the signal units 300 are disposed on different layers. The parallel electrical connection of the redundant touch lines 400 and the second sub-unit 320 needs to be achieved through the second via hole 620, so as to avoid short circuit between the redundant touch lines 400 and the connection unit 500.

Figure 13:
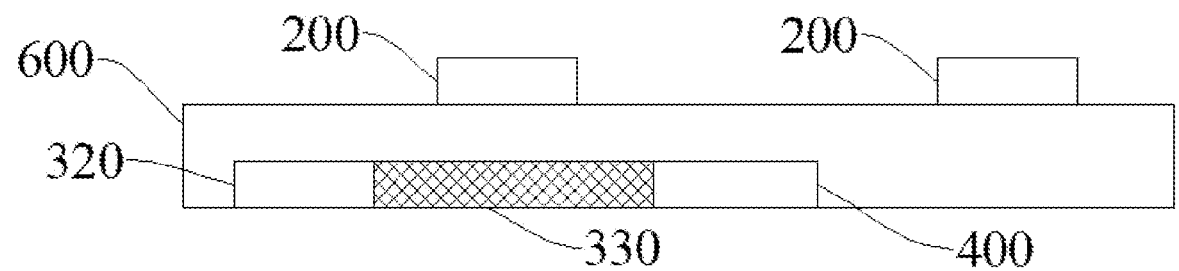
FIG. 13 is a schematic diagram of the second structure along the F1F2 section of FIG. 11.

Please refer to FIG. 13. In some embodiments, the redundant touch lines 400 and the second sub-unit 320 are disposed on the same layer, and the signal line layer includes the first connection line 330 on the same layer as the second sub-unit 320, and the first connection line 330 is electrically connected to the second sub-unit 320. The second sub-unit 320 and the corresponding redundant touch line 400 are electrically connected through the first connection line 330.

The redundant touch lines 400 and the second sub-unit 320 are disposed on the same layer. The redundant touch lines 400 and the second sub-unit 320 may be electrically connected in parallel by the first connection line 330.

Figure 14:
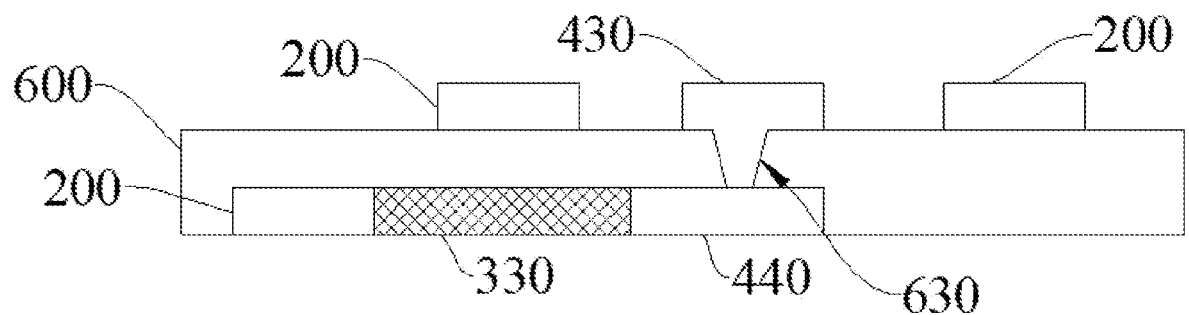
FIG. 14 is a schematic diagram of the third structure along the F1F2 section of FIG. 11.

Refer to FIG. 14. In some embodiments, at least one of the redundant touch lines 400 electrically connected to the second sub-unit 320 includes a first redundant segment 430 and a second redundant segment 440. The first redundant segment 430 is disposed on the same layer as the touch units 200, and the second redundant segment 440 is disposed on the same layer as the second sub-unit 320. The signal line layer includes a first connection line 330 disposed on the same layer as the second sub-unit 320, and the first connection line 330 is electrically connected to the second sub-unit 320. The touch panel 100 further includes a first insulating layer 600 located between the signal line layer and the touch layer. The first insulating layer 600 includes a plurality of third via holes 630, and the second redundant segment is exposed via the third via holes 630. The first redundant segment 430 is electrically connected to the second redundant segment 440 through the third via holes 630, and the second redundant segment 440 is electrically connected to the first connection line 330.

The redundant touch line 400 connected in parallel with the second sub-unit 320 includes a first redundant segment 430 and a second redundant segment 440 respectively disposed on the touch layer and the signal line layer. The first redundant segment 430 is electrically connected to the second redundant segment 440 through the third via holes 630, and the second redundant segment 440 is electrically connected to the first connection line 330, so as to further reduce the resistance of the signal units 300 far away the control unit B, to reduce the voltage drop of the signal units 300 of different lengths, to reduce the difference in touch quality in different areas, and to improve the touch experience.

Figure 15:
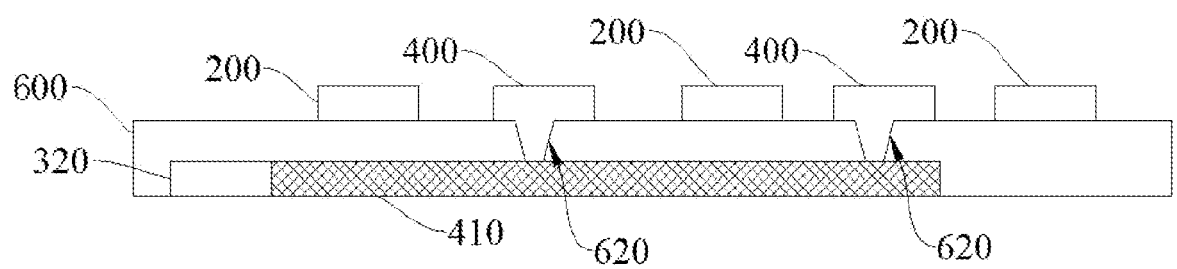
FIG. 15 is a schematic diagram of the structure along a G1G2 section or along a H1H2 section of FIG. 11.

Refer to FIG. 15. In some embodiments, one of the second subunits 320 is electrically connected in parallel with at least one of the redundant touch lines 400 of the first touch block A. For example, one of the second subunits 320 is electrically connected in parallel with the two of the redundant touch lines 400 of the first touch block A. Connection points for the two redundant touch lines 400 may be in the same X-axis direction or not in the same X-axis direction.

Figure 16:
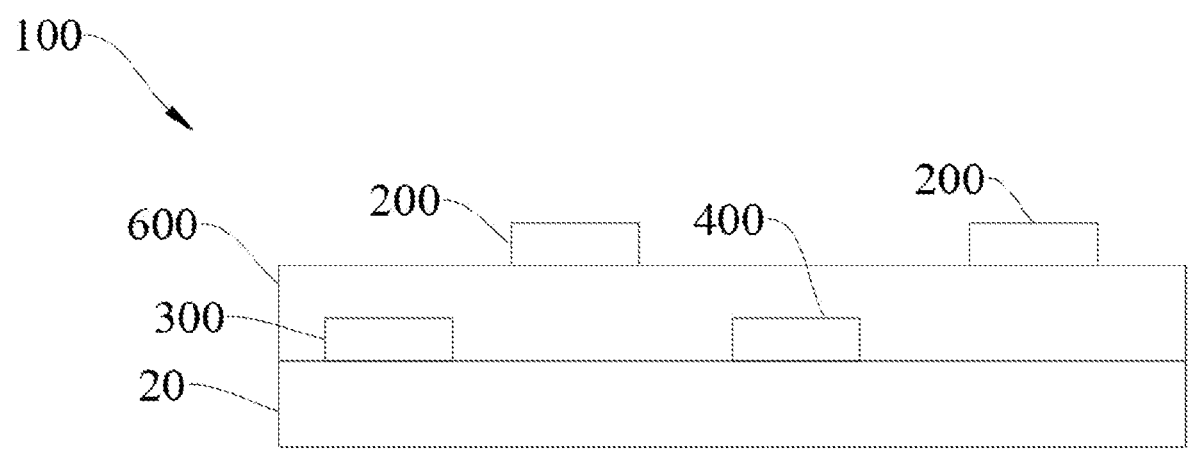
FIG. 16 is a schematic structural diagram of a second structure of a touch panel provided by an embodiment of the present disclosure.

Refer to FIG. 16. In some embodiments, the touch panel 100 further includes a display panel 20 located on one side of the signal line layer away from the touch layer, and the display panel 20 includes a plurality of sub-pixels. In the top view direction of the touch panel 100, along the first direction, any one of the touch units 200, the signal units 300, and the redundant touch lines 400 are disposed between two adjacent rows of the sub-pixels.

In FIG. 16, for drawings, the signal units 300 represent the signal line layer, and the touch units 200 represents the touch layer. The configuration of the touch units 200, the signal units 300, and the redundant touch lines 400 does not block the sub-pixels, which ensures the display transmittance and display effect.

Figure 17:
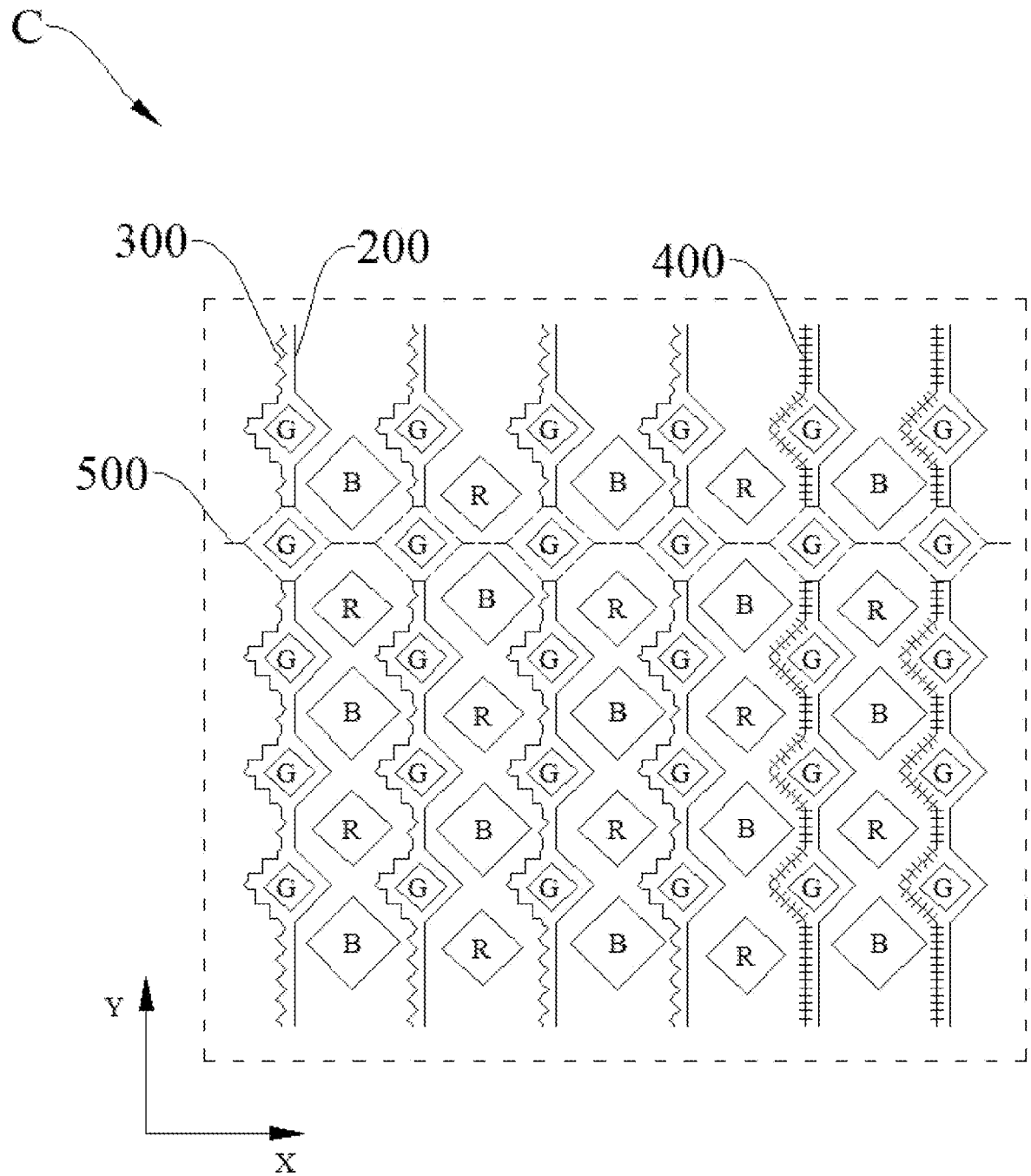
FIG. 17 is a schematic top view of a seventh structure of the area C in FIG. 1.

Refer to FIG. 17. In some embodiments, the display panel 20 includes a plurality of red sub-pixels R, green sub-pixels G, and blue sub-pixels B. Any one of the red sub-pixels R, the green sub-pixels G, and the blue sub-pixel B is the sub-pixels of the display panel 20 distributed in a first column and a second column spaced apart. The red sub-pixels R and the blue sub-pixels B correspond to the first column, and the green sub-pixels G correspond to the second column. A light-emitting area of the blue sub-pixels B is greater than a light-emitting area of the red sub-pixels R, and the light-emitting area of the red sub-pixels R is greater than a light-emitting area of the green sub-pixels G.

By configuring different areas of the sub-pixels, green light can be easily recognized by human eyes. The light-emitting area of the green sub-pixels G can be configured to be slightly small. The light-emitting areas of the blue sub-pixels B and the red sub-pixels R are configured for cost and lifetime considerations.

In some embodiments, the connection unit 500 may be disposed around the green sub-pixel G, or disposed around a single-color sub-pixel, so as to facilitate wiring and reduce the influence of different colors on the wiring.

In some embodiments, the display panel 20 includes an array substrate and a light-emitting device located on the array substrate. The light-emitting device may include Organic Light-Emitting Diode (OLED) material, or may include Micro LED Or Mini LED, and is not limited specifically herein.

In the present disclosure, one of the redundant touch lines or one of the signal units is disposed between two adjacent ones of the touch units, and the touch units are disposed evenly, so that the distribution density of the touch units in different areas is uniform, thereby improving the uniformity of touch response, enhancing the uniformity of touch accuracy, and improving touch performance.

Figure 18:
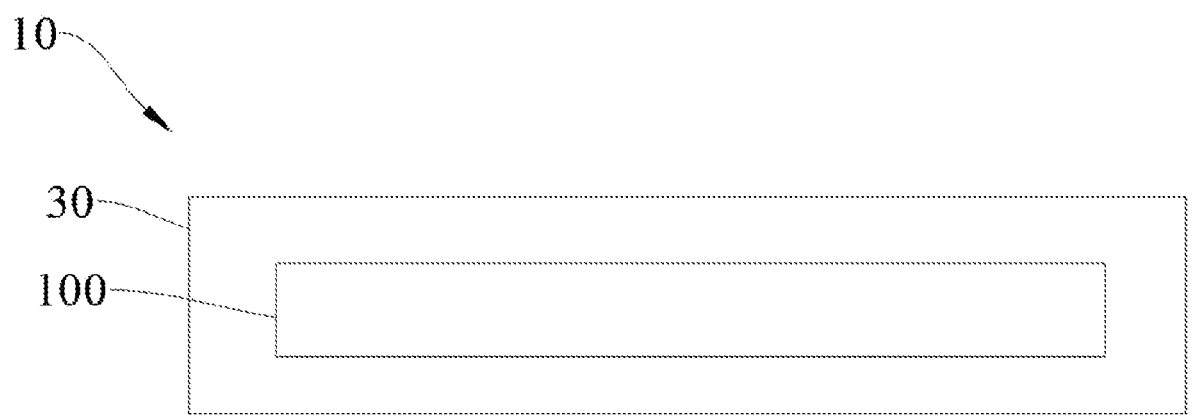
FIG. 18 is a schematic structural diagram of a mobile terminal provided by an embodiment of the present disclosure.

Please refer to FIG. 18, an embodiment of the present disclosure further provides a mobile terminal 10, including the touch panel 100 and the terminal body 30 described above, and the touch panel 100 and the terminal body 30 are combined into one body.

In the present disclosure, one of the redundant touch lines or one of the signal units is disposed between two adjacent ones of the touch units, and the touch units are disposed evenly, so that the distribution density of the touch units in different areas is uniform, thereby improving the uniformity of touch response, enhancing the uniformity of touch accuracy, and improving touch performance.

The technical solution of the present disclosure is now described with reference to specific embodiments.

In the present embodiment, for the specific structure of the touch panel 100, please refer to any of the above-mentioned embodiments of the touch panel 100 and FIGS. 1 to 17, and are not repeated herein.

In the present embodiment, the terminal body may include a middle frame, sealant, etc., and the mobile terminal may be a mobile display terminal such as a mobile phone or a tablet, and is not limited herein.

In the present disclosure, one of the redundant touch lines or one of the signal units is disposed between two adjacent ones of the touch units, and the touch units are disposed evenly, so that the distribution density of the touch units in different areas is uniform, thereby improving the uniformity of touch response, enhancing the uniformity of touch accuracy, and improving touch performance.

The embodiment of the present disclosure discloses the touch panel and the mobile terminal. The touch panel includes a touch layer, a signal line layer, and a plurality of redundant touch lines extending in a first direction. The touch layer includes a plurality of touch blocks disposed in an array at intervals. One of the touch blocks includes a plurality of touch units. The signal line layer includes a plurality of signal units, and one of the signal units is electrically connected to one of the touch blocks. The redundant touch lines are insulated from the touch units. One of the redundant touch lines or one of the signal units is disposed between two adjacent ones of the touch units. In the present disclosure, one of the redundant touch lines or one of the signal units is disposed between two adjacent ones of the touch units, and the touch units are disposed evenly, so that the distribution density of the touch units in different areas is uniform, thereby improving the uniformity of touch response, enhancing the uniformity of touch accuracy, and improving touch performance.

It can be understood that, for those of ordinary skill in the art, equivalent replacements or changes can be made according to the technical solutions of the present disclosure and its inventive concept, and all these changes or replacements shall fall within the protection scope of the appended claims of the present disclosure.

What is claimed is:

1. A touch panel, including:
   a touch layer, including a plurality of touch blocks disposed in an array at intervals, wherein one of the touch blocks includes a plurality of touch units extending along a first direction and electrically connected to each other;
   a signal line layer located on one side of the touch layer, wherein the signal line layer includes a plurality of signal units extending along the first direction, wherein one of the signal units is electrically connected to one of the touch blocks; and
   a plurality of redundant touch lines extending along the first direction, wherein the redundant touch lines are insulated from the touch units;
   wherein one of the redundant touch lines or one of the signal units is disposed between two adjacent ones of the touch units;
   wherein the touch panel further includes a display panel located on one side of the signal line layer away from the touch layer, and the display panel includes a plurality of sub-pixels;
   wherein in the top view direction of the touch panel, along the first direction, any one of the touch units, the signal units, and the redundant touch lines are disposed between two adjacent rows of the sub-pixels.

2. The touch panel of claim 1, wherein in a top view direction of the touch panel, the signal units, the redundant touch lines, and the touch units are all disposed non-overlappingly.

3. The touch panel of claim 1, wherein same number of the signal units are disposed between two adjacent ones of the redundant touch lines.

4. The touch panel of claim 3, wherein one of the touch units is disposed between two adjacent ones of the redundant touch lines.

5. The touch panel of claim 4, wherein the redundant touch lines are disposed close to a corresponding center area of the touch blocks, or the redundant touch lines are disposed close to a corresponding periphery of the touch blocks.

6. The touch panel of claim 1, wherein the signal units, the redundant touch lines, and the touch units are each disposed in a single line.

7. The touch panel of claim 1, wherein the redundant touch lines are disposed on the same layer as the touch units or/and the signal units.

8. The touch panel of claim 7, wherein the touch blocks further include at least one connection unit, the connection unit is on the same layer as the touch units and connects two adjacent ones of the touch units, the connection unit extends along a second direction, and the second direction is perpendicular to the first direction;
wherein the redundant touch lines and the signal units are disposed on the same layer, the connection unit and the touch units are disposed on the same layer, or the redundant touch lines and the touch units are disposed on the same layer, the redundant touch lines include a first unit disposed on the same layer as the touch units and a first jumper electrically connected to the first unit, the first jumper and the touch units are disposed on different layers, and the first jumper crosses the connection unit.

9. The touch panel of claim 1, wherein the touch panel further includes an integrated control unit located on one end of the touch panel, and any one of the signal units is electrically connected to the integrated control unit;
wherein at least one of the touch blocks is a first touch block, in the top view direction of the touch panel, in the first touch block, the signal unit is at least a first sub-unit or a second sub-unit, the first sub-unit is electrically connected to the first touch block, and a distance between the electrical connection point of the second sub-unit and the corresponding touch block and the integrated control unit is greater than a distance between the electrical connection point of the first sub-unit and the touch block and the integrated control unit;
wherein one of the second sub-units is electrically connected in parallel with at least one of the redundant touch lines of the first touch block.

10. The touch panel of claim 9, wherein the redundant touch lines and the touch units are disposed on the same layer;
the signal line layer includes a first connection line disposed on the same layer as the second sub-unit, and the first connection line is electrically connected to the second sub-unit; and
the touch panel further includes a first insulating layer located between the signal line layer and the touch layer, wherein the first insulating layer includes a plurality of second via holes, the first connection line is exposed through the second via hole, and the first connection line is electrically connected to the corresponding redundant touch line through the second via hole.

11. The touch panel of claim 9, wherein the redundant touch lines are disposed on the same layer as the second sub-unit, the signal line layer further includes a first connection line disposed on the same layer as the second sub-unit, the first connection line is electrically connected to the second sub-unit, and the second sub-unit and the corresponding redundant touch line are electrically connected through the first connection line.

12. The touch panel of claim 9, wherein at least one of the redundant touch lines electrically connected to the second sub-unit includes a first redundant segment and a second redundant segment, the first redundant segment is disposed on the same layer as the touch units, and the second redundant segment is disposed on the same layer as the second sub-unit;
the signal line layer includes a first connection line disposed on the same layer as the second sub-unit, and the first connection line is electrically connected to the second sub-unit; and
the touch panel further includes a first insulating layer located between the signal line layer and the touch layer, the first insulating layer includes a plurality of third via holes, the second redundant segment is exposed via the third via hole, the first redundant segment is electrically connected to the second redundant segment through the third via hole, and the second redundant segment is electrically connected to the first connection line.

13. A mobile terminal, including: a touch panel and a terminal body, the touch panel and the terminal body being combined into one body, and the touch panel including:
a touch layer, including a plurality of touch blocks disposed in an array at intervals, wherein one of the touch blocks includes a plurality of touch units extending along a first direction and electrically connected to each other;
a signal line layer located on one side of the touch layer, wherein the signal line layer includes a plurality of signal units extending along the first direction, wherein one of the signal units is electrically connected to one of the touch blocks; and
a plurality of redundant touch lines extending along the first direction, wherein the redundant touch lines are insulated from the touch units;
wherein one of the redundant touch lines or one of the signal units is disposed between two adjacent ones of the touch units;
wherein the touch panel further includes a display panel located on one side of the signal line layer away from the touch layer, and the display panel includes a plurality of sub-pixels;
wherein in the top view direction of the touch panel, along the first direction, any one of the touch units, the signal units, and the redundant touch lines are disposed between two adjacent rows of the sub-pixels.

14. The mobile terminal of claim 13, wherein in a top view direction of the touch panel, the signal units, the redundant touch lines, and the touch units are all disposed non-overlappingly.

15. The mobile terminal of claim 13, wherein same number of the signal units are disposed between two adjacent ones of the redundant touch lines.

16. The mobile terminal of claim 15, wherein one of the touch units is disposed between two adjacent ones of the redundant touch lines.

17. The mobile terminal of claim 16, wherein the redundant touch lines are disposed close to a corresponding center area of the touch blocks, or the redundant touch lines are disposed close to a corresponding periphery of the touch blocks.

18. The mobile terminal of claim 13, wherein the signal units, the redundant touch lines, and the touch units are each disposed in a single line.

19. The mobile terminal of claim 13, wherein the redundant touch lines are disposed on the same layer as the touch units or/and the signal units.

\* \* \* \* \*